(12) United States Patent  
Takahashi et al.

(10) Patent No.: US 9,096,153 B2
(45) Date of Patent: Aug. 4, 2015

(54) VEHICLE SEAT WITH FUNCTION OF ABSORBING VOLATILE SUBSTANCES

(71) Applicants: TS TECH Co., Ltd., Saitama (JP); HONDA MOTOR Co., Ltd., Tokyo (JP)

(72) Inventors: Junichi Takahashi, Tochigi (JP); Takako Fukuda, Tochigi (JP); Hideyuki Yanagita, Tochigi (JP); Harutomi Nishide, Saitama (JP); Yoshiyuki Ito, Saitama (JP); Tetsushi Yamada, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 14/030,171

(22) Filed: Sep. 18, 2013

(65) Prior Publication Data

US 2014/0015292 A1    Jan. 16, 2014

Related U.S. Application Data

(63) Continuation of application No. 13/745,027, filed on Jan. 18, 2013, now abandoned, which is a continuation of application No. 13/477,451, filed on May 22, 2012, now abandoned, which is a continuation of application No. 13/252,510, filed on Oct. 4, 2011, now abandoned, which is a continuation of application No. 12/904,498, filed on Oct. 14, 2010, now abandoned, which is a continuation of application No. 11/525,194, filed on Sep. 21, 2006, now abandoned.

(30) Foreign Application Priority Data

Sep. 21, 2005    (JP) ................................. 2005-274302

(51) Int. Cl.
| | |
|---|---|
| *B60N 2/44* | (2006.01) |
| *A47C 27/12* | (2006.01) |
| *B60H 3/00* | (2006.01) |
| *B60N 2/70* | (2006.01) |

(52) U.S. Cl.
CPC . *B60N 2/44* (2013.01); *A47C 27/12* (2013.01); *B60H 3/00* (2013.01); *B60N 2/70* (2013.01)

(58) Field of Classification Search
CPC ............ A47C 27/12; B60N 2/44; B60N 2/70; B60H 3/00
USPC ...................................................... 297/452.53
See application file for complete search history.

(56) References Cited

U.S. PATENT DOCUMENTS

| | | | | |
|---|---|---|---|---|
| 3,610,688 | A * | 10/1971 | Arnold et al. ......... | 297/452.53 X |
| 3,638,255 | A * | 2/1972 | Sterrett ..................... | 5/641 X |
| 3,995,893 | A * | 12/1976 | De La Taille et al. .................... | 297/452.53 X |
| 6,565,157 | B2 * | 5/2003 | Barile et al. ......... | 297/452.53 X |
| 6,893,632 | B2 * | 5/2005 | Johnson ................... | 424/76.1 X |

FOREIGN PATENT DOCUMENTS

| | | |
|---|---|---|
| JP | 62-068653 U | 4/1987 |
| JP | 63-117344 U | 7/1988 |

(Continued)

*Primary Examiner* — Anthony D Barfield
(74) *Attorney, Agent, or Firm* — Drinker Biddle & Reath LLP

(57) ABSTRACT

A vehicle seat with a function of absorbing volatile substances in an interior of a vehicle with the seat is disclosed. The vehicle seat comprises a seat frame structure, a cushioned padding member supported on the seat frame structure, and a volatile substances-absorbing member provided on a surface of the cushioned padding member which faces the seat frame structure.

20 Claims, 3 Drawing Sheets

(56) References Cited

FOREIGN PATENT DOCUMENTS

| JP | 01-119553 U | 8/1989 |
| JP | 02-059653 U | 5/1990 |
| JP | 02-259149 A | 10/1990 |
| JP | 3022096 U | 12/1995 |
| JP | 10-327980 A | 12/1998 |
| JP | 2003-009998 A | 1/2003 |
| JP | 2004-338618 A | 12/2004 |

* cited by examiner

VEHICLE SEAT WITH FUNCTION OF ABSORBING VOLATILE SUBSTANCES

REFERENCE TO PRIOR APPLICATIONS

This application is a continuation of U.S. application Ser. No. 13/745,027, filed Jan. 18, 2013, which is a continuation of U.S. Ser. No. 13/477,451, filed May 22, 2012, abandoned, which is a continuation of U.S. application Ser. No. 13/252,510, filed Oct. 4, 2011, abandoned, which is a continuation of U.S. application Ser. No. 12/904,498 filed on Oct. 14, 2010, abandoned, which is a continuation of U.S. application Ser. No. 11/525,194, filed on Sep. 21, 2006, abandoned, the entireties of which are incorporated herein by reference.

BACKGROUND

1. Field

Disclosed herein is a vehicle seat which can exert a function of absorbing any volatile substances in an interior of a vehicle.

2. Description of the Related Art

Hitherto, there has been proposed a vehicle seat provided with a sheet of a nonwoven fabric to which a chemical reactive deodorant including a deodorant oxidation-decomposing is applied and which can therefore exert a function of deodorizing unpleasant odor components caused by such as the sweat smell of a passenger, the smell of tobacco smoke, or the like (Japanese Patent Application Laid-Open No. Hei. 10-327980). The nonwoven fabric sheet with the function of deodorizing is employed as a covering member for a seat cushion of the vehicle seat and provided so as to cover a lower portion of the seat cushion.

In the conventional vehicle seat, there is a possibility that the deodorant will be peeled off from the nonwoven fabric sheet, resulting in losing the deodorizing function. In addition, areas of the nonwoven fabric sheet from which the deodorant is peeled off are exposed as dirty areas, resulting in detracting from the appearance of the vehicle seat.

SUMMARY

Disclosed herein is a vehicle seat with a function of absorbing volatile substances that addresses some of the previous design drawbacks.

It is therefore an object to provide a vehicle seat with a prolonged function of efficiently absorbing and eliminating any volatile substances caused by any smell or odors in an interior of a vehicle with the vehicle seat.

It is another object to provide a vehicle seat which can easily provide a function of absorbing any volatile substances in an interior of a vehicle with the seat, without modifying structural members for the vehicle seat and changing the appearance of the vehicle seat.

Accordingly, there is provided a vehicle seat with a function of absorbing volatile substances. The vehicle seat comprises a seat frame, a cushioned pad supported on the seat frame, and a volatile substances absorber that absorbs any volatile substances in an interior of a vehicle, the volatile substances absorber being provided on a surface of the cushioned pad which faces the seat frame.

In an embodiment, the volatile substances absorber comprises a sheet of a nonwoven fabric. The nonwoven fabric may comprise an activated carbon fabric.

In the vehicle seat constructed as discussed above, the volatile substances absorber is provided on the surface cushioned pad which faces the seat frame, so that the volatile substances absorber is subjected to the loading imposed by a passenger sitting on the vehicle seat, and is directly affected by air-exhaust and air-suction which are caused by repeated compression and restoration of the cushioned pad when the vehicle employing the seat is traveled and subjected to vibration or the like. Therefore, the volatile substances absorber can efficiently absorb and eliminate any volatile substances in the interior of the vehicle.

Moreover, the volatile substances absorber can prevent the cushioned pad from being directly contacted with the seat frame. Therefore, there is no possibility that noise will be produced by rubbing the cushioned pad against the seat frame. In addition, the volatile substances absorber is applied onto the surface of the cushioned pad and housed within the interior of the vehicle seat, so that the volatile substances absorber can easily provide the function of absorbing the volatile substances, to the vehicle seat, without modifying structural members of the vehicle seat and changing the appearance of the vehicle seat.

The seat frame may comprise a seat frame for a seat back of the vehicle seat and/or a seat frame for a seat cushion of the vehicle seat. The cushioned pad may comprise a cushioned padding for the seat back and/or a cushioned padding for the seat cushion. The volatile substances absorber is provided on a surface of the cushioned padding of the seat back which faces the seat frame of the seat back, and/or a surface of the cushioned padding of the seat cushion which faces the seat frame of the seat cushion.

When the volatile substances absorber is applied to both the cushioned padding of the seat back and the cushioned padding of the seat cushion, volatile substances-absorbing area is increased, so that it is possible to more effectively absorb and eliminate the volatile substances in the interior of the vehicle.

These and other objects and many of the attendant advantages of the present invention will be readily appreciated as the same becomes better understood by reference to the following detailed description when considered in connection with the accompanying drawings.

DETAILED DESCRIPTION

Figure 1:
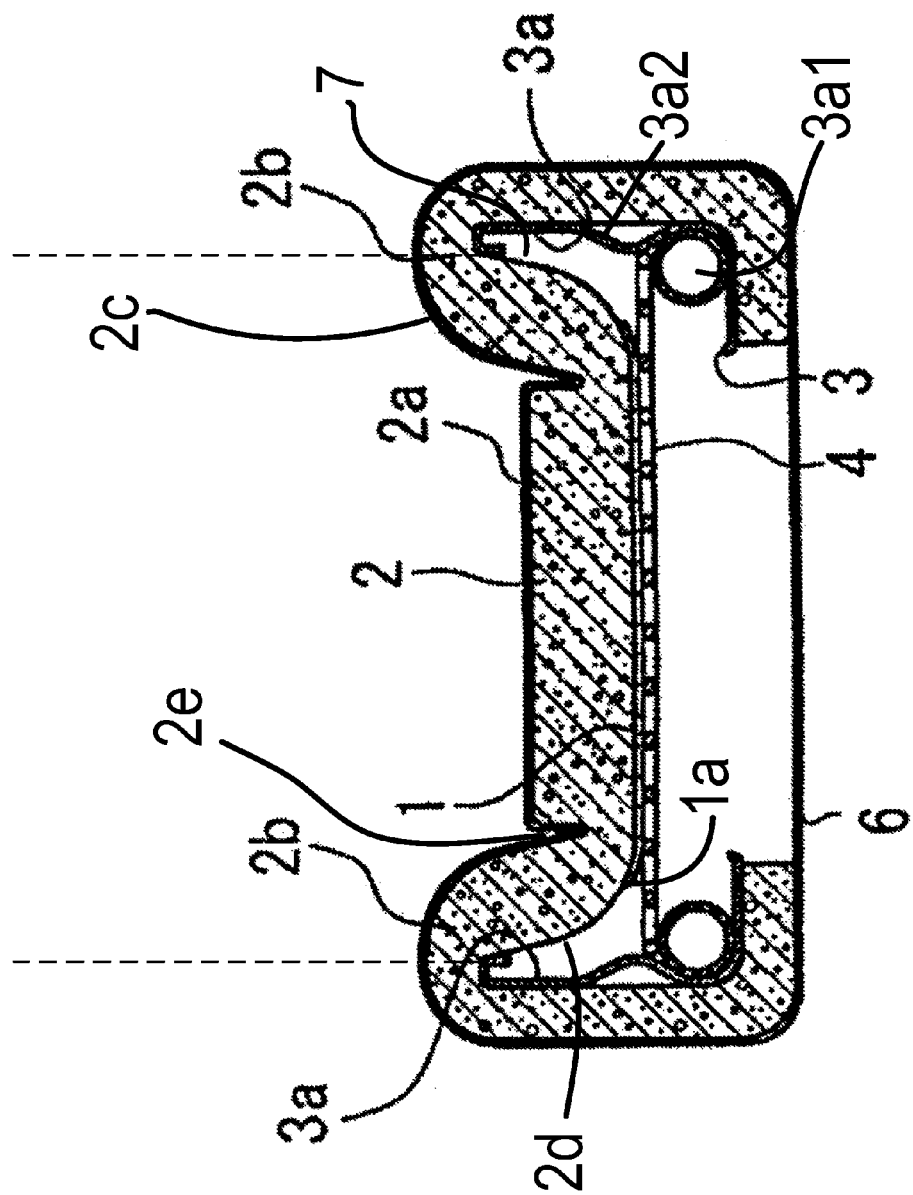
FIG. 1 is a schematic sectional view of a seat back for a vehicle seat according to the present invention.

Referring now FIG. 1, there is illustrated a seat back of a vehicle seat according to an embodiment of the present invention. The seat back includes a volatile substances absorber 1 capable of absorbing any volatile substances in an interior of a vehicle with the seat and having end portions 1a, a cushioned padding 2, a seat back frame 3, and cushion springs 4 (only one cushion spring 4 is shown in FIG. 1). The cushion springs 4 are stretched between a pair of spaced apart side sections 3a of the seat back frame 3. The side sections each comprise a pipe member 3a1 and plate member 3a2. The volatile substances absorber 1 comprises a sheet of a nonwoven fabric. The cushioned padding 2 is made from a resin-foamed, molded product and comprises a first section 2a which corresponds to a section of the seat back of the vehicle seat on which a passenger rests when the passenger sits on the vehicle seat, second ridge sections 2b respectively formed at the left and right side portions of the first section 2a of the cushioned padding 2, a compressible portion 2c having a side surfaces 2d and slits 2e. The cushioned padding 2 is supported on the seat back frame 3 and the cushion springs 4 with the first section 2a being carried on the cushion springs 4, with the nonwoven fabric sheet 1 being sandwiched between the first section 2a of the cushioned padding 2 and the cushion springs 4, and with the second ridge sections 2b enclosing the side sections 3a of the seat back frame 3, thereby forming a space portion 7.

Figure 2:
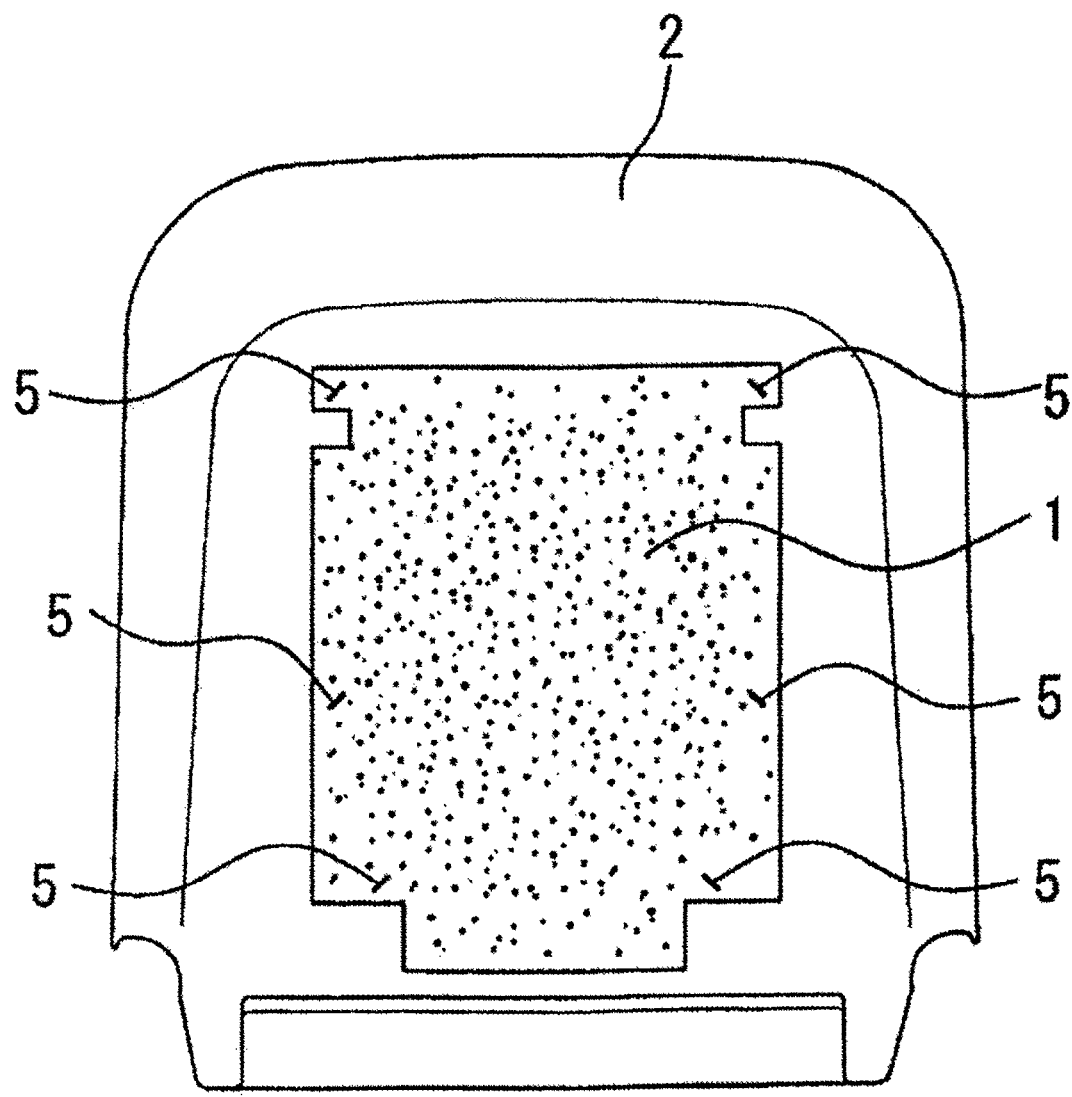
FIG. 2 is a schematic rear elevation of a cushioned padding for the seat back of FIG. 1.

Referring to FIG. 2, the nonwoven fabric sheet 1 is applied onto a substantially entire area of a back surface of the first section of the cushioned padding 2 which faces the seat back frame 3, and fixed at peripheral regions of the nonwoven fabric sheet 1 to the cushioned padding 2 by applying H-shaped resinous clips 5.

Figure 3:
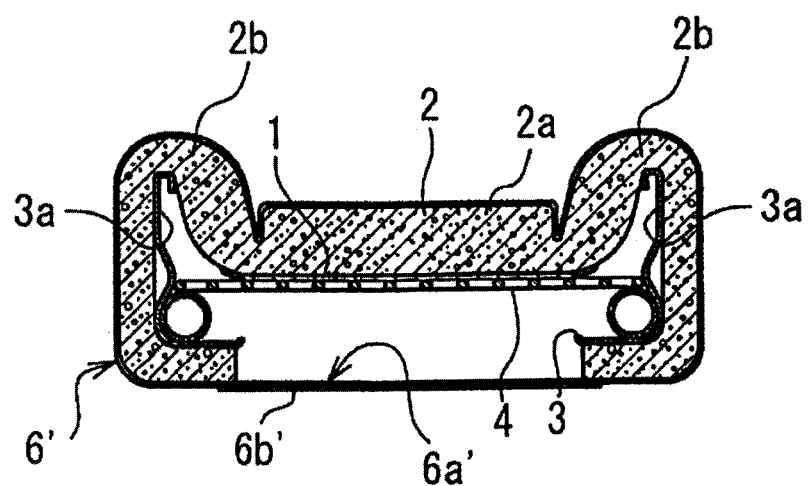
FIG. 3 is a schematic sectional view of a seat back according to a modification of the seat back shown in FIG. 1.

The cushioned padding 2 which is supported to the seat back frame 3 and the cushion springs 4 is covered with a bag-shaped covering member 6 (see FIG. 1) or a bag-shaped covering member 6' (see FIG. 3) having an opening 6a' in a back side thereof, and a back board 6b' covering the opening 6a', whereby an assembly comprising the cushioned padding 2 supported to the seat back frame 3 and the cushion springs 4, and the covering member 6 (6') is assembled. Thus, the nonwoven fabric sheet 1 is housed within an interior of the seat back.

The nonwoven fabric may employ any suitable nonwoven fabric as far as it is capable of absorbing volatile substances caused by the sweat smell of the passenger, the smell of tobacco smoke, the smell of a pet animal, any volatile substances produced from any equipment in the vehicle, and the like. The nonwoven fabric may employ, for example, an activated carbon fabric. When employing a sheet of a nonwoven fabric to which a volatile substances-absorbing agent or a deodorant is applied in order that the nonwoven fabric sheet can exert a function of absorbing volatile substances, there is a possibility that the volatile substances-absorbing agent and the deodorant will be peeled off from the nonwoven fabric sheet, resulting in losing the function of the absorbing or deodorizing. In addition, areas of the nonwoven fabric sheet from which the agent or the deodorant is peeled off are left as dirty areas. When the activated carbon fabric sheet is employed as the volatile substances absorber 1, such problems do not arise. Therefore, the activated carbon fabric sheet is preferably employed as the volatile substances absorber 1. A thickness of the nonwoven fabric sheet is preferably about 0.2-5 mm, and better yet about 0.4-0.6 mm.

In the seat back constructed as discussed above, the nonwoven fabric sheet 1 is subjected to the loading imposed by the passenger sitting on the vehicle seat, and is directly affected by air-exhaust and air-suction which are caused by repeated compression and restoration of the compressible portion 2c of the cushioned padding 2 when the vehicle employing the seat is traveled and subjected to vibration or the like. Therefore, the nonwoven fabric sheet 1 can efficiently absorb and eliminate the volatile substances in the interior of the vehicle.

Moreover, the nonwoven fabric sheet 1 can prevent the cushioned padding 2 from directly contacting with the seat back frame 3 and the cushion springs 4. Therefore, there is no possibility that noise will be produced by rubbing the cushioned padding 2 against the seat back frame 3 and the cushion springs 4. In addition, the nonwoven fabric sheet 1 is applied onto the back surface of the cushioned padding 2 and housed within the interior of the seat back so that the nonwoven fabric sheet 1 can easily provide the function of absorbing the volatile substances, to the vehicle seat, without modifying structural members of the vehicle seat and changing the appearance of the vehicle seat.

While the embodiment of the present invention has been described in connection with the case where the present invention is applied to the seat back of the vehicle seat, this design may be applied to a seat cushion of the vehicle seat. In this case, the volatile substances absorber 1 is applied to a bottom surface of a cushioned padding for the seat cushion, which faces a seat cushion frame, and fixed onto the bottom surface of the cushioned padding for the seat cushion. Moreover, the volatile substances absorber 1 may be applied to both the cushioned padding of the seat back and the cushioned padding of the seat cushion. In this case, volatile substances-absorbing area is increased, so that it is possible to more effectively absorb and eliminate the volatile substances in the interior of the vehicle.

These and other advantages will be apparent to those skilled in the art from the foregoing specification. Accordingly, it will be recognized by those skilled in the art that changes or modifications may be made to the above-described embodiment without departing from the broad inventive concepts of the invention. It should therefore be understood that this invention is not limited to the particular embodiment described herein, but is intended to include all changes and modifications that are within the scope and spirit of the invention as set forth in the claims.

TABLE OF REFERENCE CHARACTERS 1 volatile substances absorber
1a end
2 cushioned padding
2a first section
2b second ridge sections
2c compressible portion
2d side surface of compressible portion
2e slit
3 seat back frame
3a spaced apart side sections
3a1 pipe member
3a2 plate member
4 cushion springs
5 H-shaped resinous clips
6, 6' bag-shaped covering member
6a' opening
6b' back board
7 space portion

What is claimed is:

1. A vehicle seat with a function of absorbing volatile substances, the vehicle seat comprising:
  a seat frame having a pair of spaced apart side sections;
  a support member for supporting a seat occupant disposed between said spaced apart side sections of said seat frame, the support member comprising an elastic member;
  a cushioned padding supported on said seat frame that comprises a padding compressible portion that is supported by the elastic member and that is located between the pair of side sections of the seat frame, the padding compressible portion comprising a side surface;
  a space portion formed between one of the side sections and the side surface of the padding compressible portion; and
  a volatile substances-absorber capable of absorbing any volatile substances in an interior of a vehicle;
  said volatile substances-absorber being:
    applied and fixed only onto a first surface of said cushioned padding that is a rear surface of the padding compressible portion which faces said support member and is opposite to a second surface of said cushioned padding that supports a seated occupant, wherein said first surface is an outermost surface of a portion of the cushioned padding; and arranged so as to be spaced apart from said seat frame and disposed between said first surface of said cushioned padding and said support member.

2. A vehicle seat according to claim 1, wherein said volatile substances-absorber is:

formed into a sheet-shape;

arranged on a substantially entire area of said first surface of said cushioned padding; and fixed at peripheral regions of the sheet-shaped volatile substances-absorber to said cushioned padding.

3. A vehicle seat according to claim 1, further comprising: a covering member covering said cushioned padding which is supported to said seat frame and said support member, wherein said volatile substances-absorber is covered with said covering member.

4. A vehicle seat according to claim 1, further comprising a covering member covering said cushioned padding, wherein said covering member is formed into a bag-shape and has an opening in a back side thereof, said opening of said bag-shaped covering member being covered with a back board, wherein said volatile substances-absorber is covered with said back board.

5. A vehicle seat according to claim 1, wherein said volatile substances-absorber contacts with said first surface and said support member.

6. A vehicle seat according to claim 1, wherein said volatile substances-absorber is disposed in front of said support member and contacts with said first surface and said support member.

7. A vehicle seat according to claim 1, wherein said volatile substances-absorber is disposed in an area that is subjected to a loading imposed by said occupant and that is directly affected by air-exhaust and air-suction caused by compression and restoration of said cushioned padding.

8. A vehicle seat according to claim 1, wherein a length between both ends in a lateral direction of said support member is longer than a length between both ends in a lateral direction of said volatile substances-absorber.

9. A vehicle seat according to claim 1, wherein:

said cushioned padding comprises a first section that receives a loading imposed by said occupant, second ridge sections formed at right and left side portions of said first section, and right and left slits formed between said first section and each of said second ridge sections; and a length between both ends in a lateral direction of said volatile substances-absorber is longer than a length between said right and left slits in a lateral direction.

10. A vehicle seat according to claim 1, wherein:

each of said spaced apart side sections of said seat frame is provided with a flange portion extending inward at a rear end of said side section; and a length between both ends in a lateral direction of said volatile substances-absorber is longer than a length between inner ends of said flange portions in a lateral direction.

11. A vehicle seat according to claim 1, wherein:

said cushioned padding comprises a rear section that covers said seat frame at a rear side thereof and an opening formed in said rear section; and a length between both ends in a lateral direction of said volatile substances-absorber is longer than a width of said opening in a lateral direction.

12. A vehicle seat according to claim 1, wherein a thickness of said support member in a front-to-rear direction is larger than a thickness of said volatile substances-absorber in a front-to-rear direction.

13. A vehicle seat according to claim 1, wherein a thickness of said volatile substances-absorber is within a range of 0.2-5 mm.

14. A vehicle seat according to claim 1, wherein a thickness of said volatile substances-absorber is within a range of 0.4-0.6 mm.

15. A vehicle seat according to claim 1, wherein each end portion in a lateral direction of said volatile substances-absorber extends away from said support member in a front-to-rear direction.

16. A vehicle seat according to claim 1, wherein each end portion in a lateral direction of said volatile substances-absorber curves along a curved surface shape of said outermost end of said cushioned padding.

17. A vehicle seat according to claim 1, wherein:

said cushioned padding comprises a rear section that covers said seat frame at a rear side thereof and an opening formed in said rear section; and a width of said opening in a lateral direction is set so that both lateral ends of said volatile substances-absorber are visible from outside through said opening.

18. A vehicle seat according to claim 1, wherein:

each of said spaced apart side sections of said seat frame is provided with an attachment portion to which said support member is attached;

said attachment portion offsets inward from a lateral outer end surface of said side portion.

19. A vehicle seat according to claim 1, wherein:

said seat frame is adapted to be used for a seat back of said vehicle seat;

said cushioned padding comprises a cushioned padding for the seat back; and said first surface is a rear surface of said cushioned padding of said seat back.

20. A vehicle seat according to claim 1, wherein:

said seat frame is adapted to be used for a seat cushion of said vehicle seat;

said cushioned padding comprises a cushioned padding for the seat cushion; and said first surface is a bottom surface of said cushioned padding of said seat cushion.

* * * * *